(12) United States Patent
Miyake (10) Patent No.: US 7,377,470 B2
(45) Date of Patent: May 27, 2008

(54) WIRELESS-CONTROLLED AIRPLANE

(76) Inventor: Haru Miyake, 36-2, Yomogidai, 1-chome, Meitou-ku, Nagoya-city, Aichi 465-0091 (JP)

( * ) Notice: Subject to any disclaimer, the term of this patent is extended or adjusted under 35 U.S.C. 154(b) by 28 days.

(21) Appl. No.: 11/252,185

(22) Filed: Oct. 18, 2005

(65) Prior Publication Data
US 2007/0084971 A1 Apr. 19, 2007

(51) Int. Cl.
B64C 13/20 (2006.01)
(52) U.S. Cl. .................... 244/190; 244/99.11; 244/218
(58) Field of Classification Search ................ 244/190, 244/900, 175, 3.11, 2, 49, 48, 901, 99.11, 244/218; 446/34
See application file for complete search history.

(56) References Cited

U.S. PATENT DOCUMENTS

| | | | | | |
|---|---|---|---|---|---|
| 1,928,336 | A | * | 9/1933 | Kindelberger | 244/49 |
| 1,998,148 | A | * | 4/1935 | Vieriu | 244/49 |
| 2,074,897 | A | * | 3/1937 | Everts | 244/46 |
| 2,501,920 | A | * | 3/1950 | Steigel | 244/49 |
| 2,673,047 | A | * | 3/1954 | Scarato | 244/49 |
| 2,692,095 | A | * | 10/1954 | Carpenter | 244/50 |
| 3,056,564 | A | * | 10/1962 | Zuck | 244/2 |
| RE25,368 | E | * | 4/1963 | Rethorst et al. | 244/2 |
| 3,612,440 | A | * | 10/1971 | Strong | 244/2 |
| 3,647,163 | A | * | 3/1972 | Swwwney | 244/49 |
| 4,106,727 | A | * | 8/1978 | Ortell | 244/49 |
| 4,158,448 | A | * | 6/1979 | Mochizuki | 244/13 |
| 4,194,708 | A | * | 3/1980 | Tracy et al. | 244/15 |
| 5,046,979 | A | * | 9/1991 | Ragan et al. | 446/57 |
| 5,118,052 | A | * | 6/1992 | Alvarez Calderon F | 244/49 |
| 5,267,501 | A | * | 12/1993 | Shillig | 89/1.51 |
| 5,312,070 | A | * | 5/1994 | Arena | 244/46 |
| 5,766,055 | A | * | 6/1998 | Kim et al. | 446/62 |
| 5,779,190 | A | * | 7/1998 | Rambo et al. | 244/54 |
| 5,899,410 | A | * | 5/1999 | Garrett | 244/45 R |
| 5,915,650 | A | * | 6/1999 | Petrovich | 244/46 |
| 6,073,882 | A | * | 6/2000 | Zieger | 244/49 |
| 6,129,306 | A | * | 10/2000 | Pham | 244/2 |
| 6,280,280 | B1 | * | 8/2001 | Vicino et al. | 446/62 |
| 6,576,880 | B2 | * | 6/2003 | Martorana et al. | 244/3.1 |
| 7,014,141 | B2 | * | 3/2006 | Cox et al. | 244/3.11 |

(Continued)

FOREIGN PATENT DOCUMENTS

JP 07-040897 2/1995

(Continued)

*Primary Examiner*—Michael J. Carone
*Assistant Examiner*—Benjamin P Lee
(74) *Attorney, Agent, or Firm*—Bacon & Thomas, PLLC (57) ABSTRACT

A wireless-controlled airplane includes a flying unit and an on-ground controller which is connected to the flying unit through a communication section and flies the flying unit. The flying unit includes a body, a drive section installed on the body, a propulsion apparatus which generates a propulsive force when driven by the drive section, a main wing including a plurality of wing elements which are installed so as to be able to move with respect to each other, an opening and closing mechanism which changes the relative positions of the wing elements to change the effective area of the main wing, and a dropping apparatus which selectively holds and drops a load. By changing the effective area of the main wing, the flight speed can be changed, so the capacity and size of the drive section for rotating the propulsion apparatus can be decreased.

5 Claims, 9 Drawing Sheets

U.S. PATENT DOCUMENTS

| | | | |
|---|---|---|---|
| 7,063,291 B2* | 6/2006 | Rado | 244/106 |
| 7,185,847 B1* | 3/2007 | Bouchard et al. | 244/46 |
| 2005/0045765 A1* | 3/2005 | Pitt | 244/46 |
| 2005/0274845 A1* | 12/2005 | Miller et al. | 244/49 |
| 2006/0113428 A1* | 6/2006 | Choi | 244/190 |

FOREIGN PATENT DOCUMENTS

| | | |
|---|---|---|
| JP | 08-033772 | 2/1996 |
| JP | 2005-040407 | 2/2005 |

\* cited by examiner

WIRELESS-CONTROLLED AIRPLANE

BACKGROUND OF THE INVENTION

1. Field of the Invention

The present invention relates to a wireless-controlled airplane.

2. Description of the Related Art

An example of a conventional wireless-controlled airplane is disclosed in Japanese Patent Application Laid-Open (kokai) No. H8-33772. That airplane includes a propeller for generating a propulsive force and a kite wing for generating lift. The front portion of the airplane and a vertical tail wing are connected by a body, the kite wing is installed above the body, and the propeller is installed between the kite wing and the body.

In the above-described conventional wireless-controlled airplane, in order to increase the flight speed during flight, it is conceivable to either raise and lower flaps or to change the rotational speed of the propeller. However, raising and lowering the flaps changes the lift which is generated, so it is preferable to change the flight speed by changing the rotational speed of the propeller.

In the case where the rotational speed of the propeller is changed so as to increase the flight speed, it is necessary to increase the capacity of a motor (drive section) for rotating the propeller. This results in the wireless-controlled airplane increasing in size. Therefore, when the wireless-controlled airplane is used to transport a load, it becomes difficult to guarantee space in the airplane for housing the load.

SUMMARY OF THE INVENTION

An object of the present invention is to solve the above-mentioned problems of a conventional wireless-controlled airplane and to provide a wireless-controlled airplane which can decrease the capacity of a drive section, thereby making it possible to reduce the size of the airplane.

To achieve the above object, a wireless-controlled airplane according to the present invention has a flying unit and an on-ground controller which is connected to the flying unit by a communication section and which flies the flying unit in accordance with operation by an operator.

The flying unit includes a body, a drive section which is installed on the body, a propulsion apparatus which is driven by the drive section to generate a propulsive force, a main wing comprising a plurality of wing elements which are installed so as to be able to move with respect to each other, an opening and closing mechanism which varies the relative position of each of the wing elements so as to change the effective area of the main wing, and a dropping apparatus which can selectively hold and drop a load.

With this structure, by changing the effective area of the main wing, the flying speed can be changed, so the capacity of the drive section for rotating the propulsion apparatus can be decreased. Accordingly, the wireless-controlled airplane can be reduced in size.

The flying unit may further include a present location sensing portion which senses the present location of the flying unit and flight processing means which causes the flying unit to fly along a previously set flight path in accordance with the present location.

The flying unit may additionally include drop processing means which drops a load at a previously set drop point.

The flying unit may also be equipped with an auxiliary wing disposed between the main wing and the body.

BRIEF DESCRIPTION OF THE DRAWINGS

The structure and features of the wireless-controlled airplane according to the present invention will be readily appreciated as the same becomes better understood by referring to the drawings, in which.

DESCRIPTION OF PREFERRED EMBODIMENTS

Embodiments of the present invention will next be described in detail with reference to the drawings.

Figure 1:
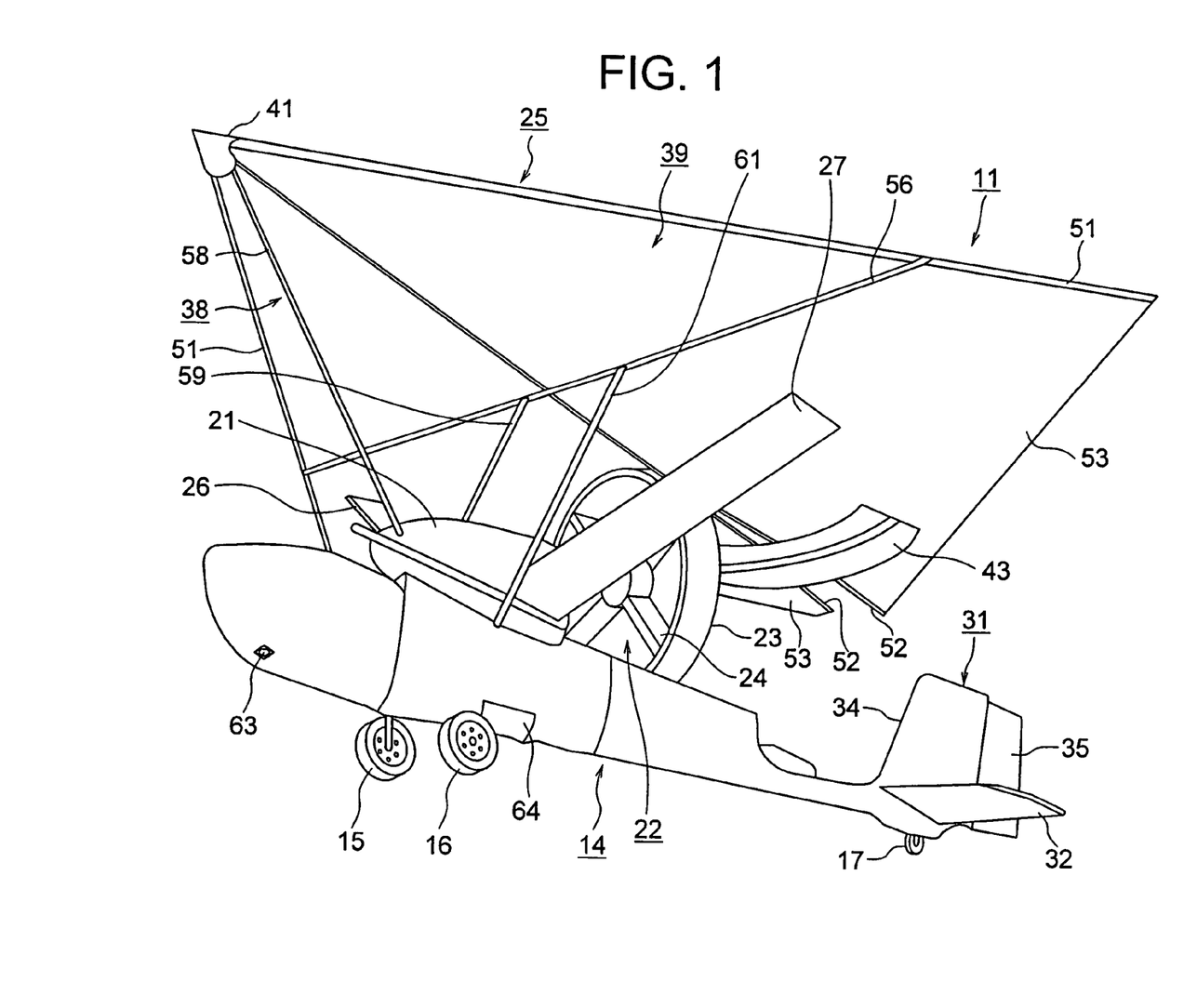
FIG. 1 is a perspective view of a flying unit in a first embodiment of the present invention.
Figure 2:
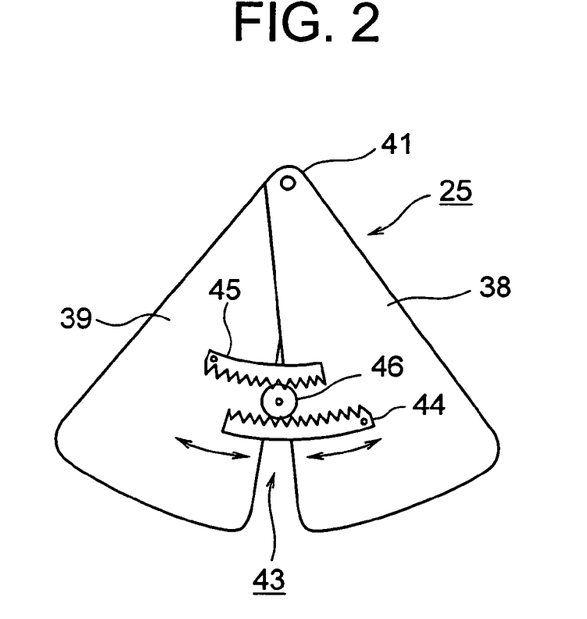
FIG. 2 is a schematic plan view of an opening and closing mechanism in the first embodiment.
Figure 3:
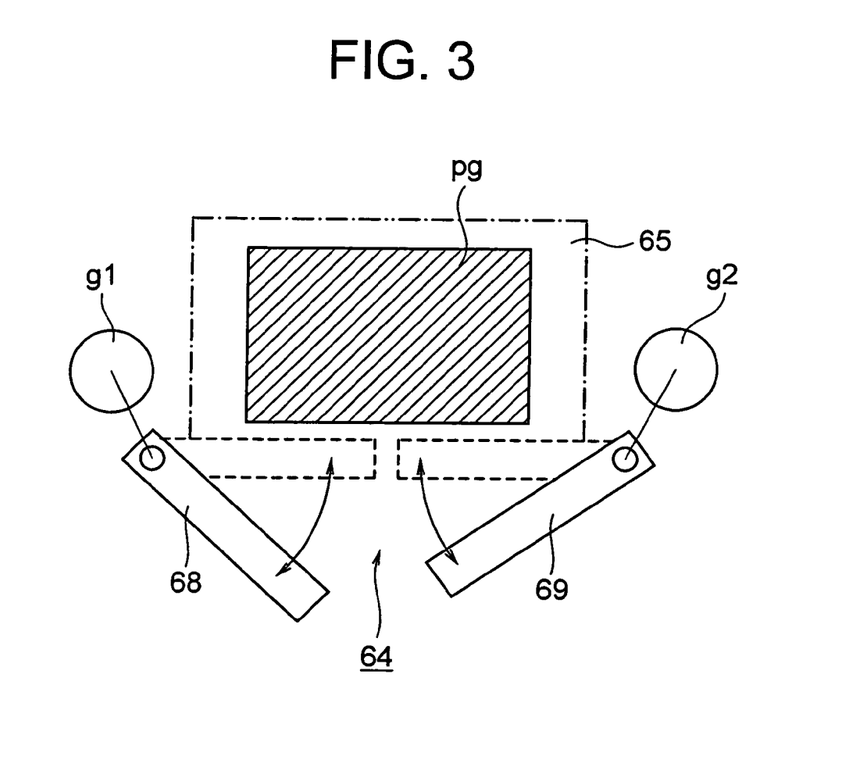
FIG. 3 is a schematic elevation of a dropping apparatus in the first embodiment.
Figure 4:
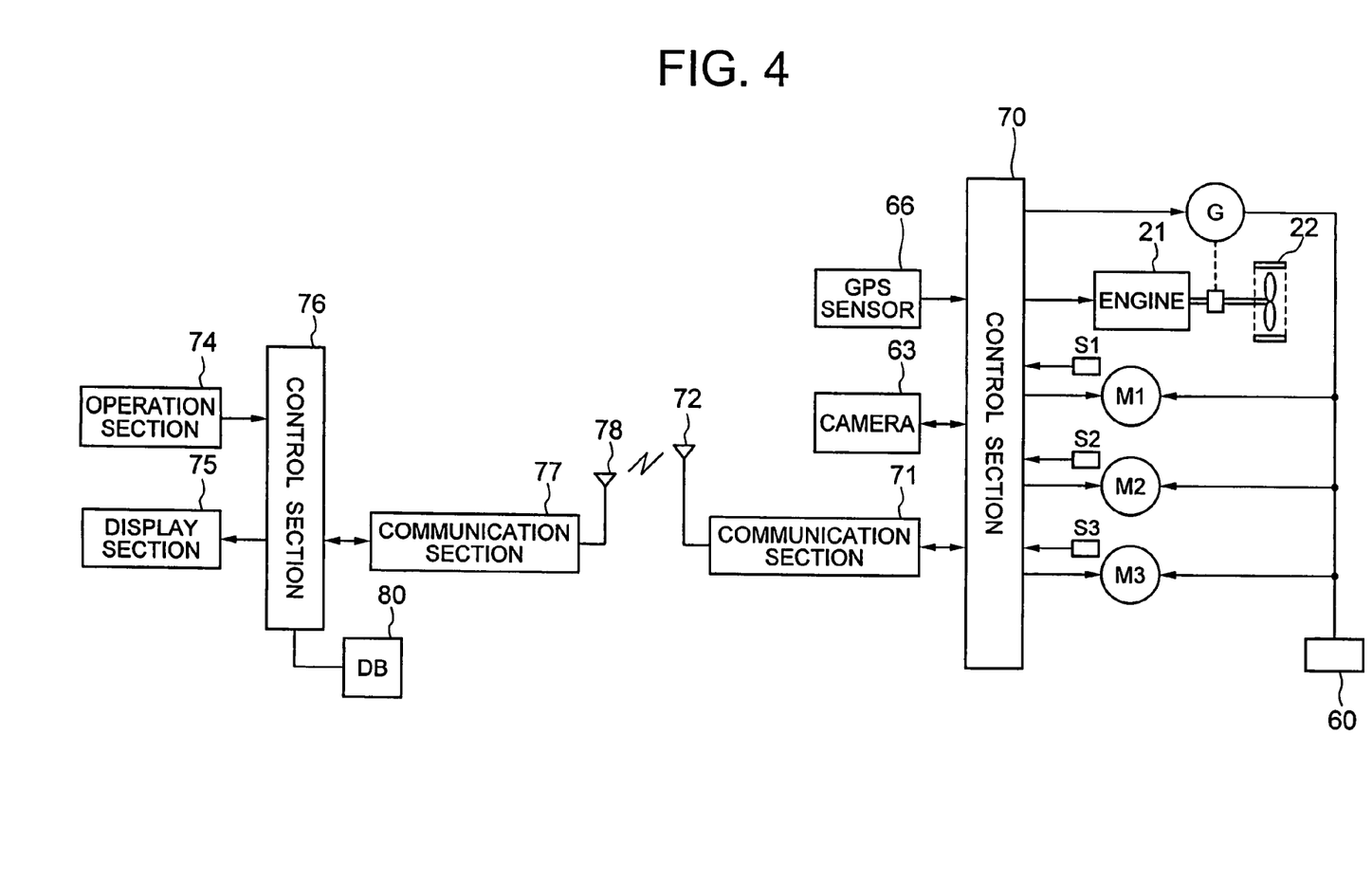
FIG. 4 is a block diagram of a control system of a wireless-controlled airplane in the first embodiment.
Figure 5:
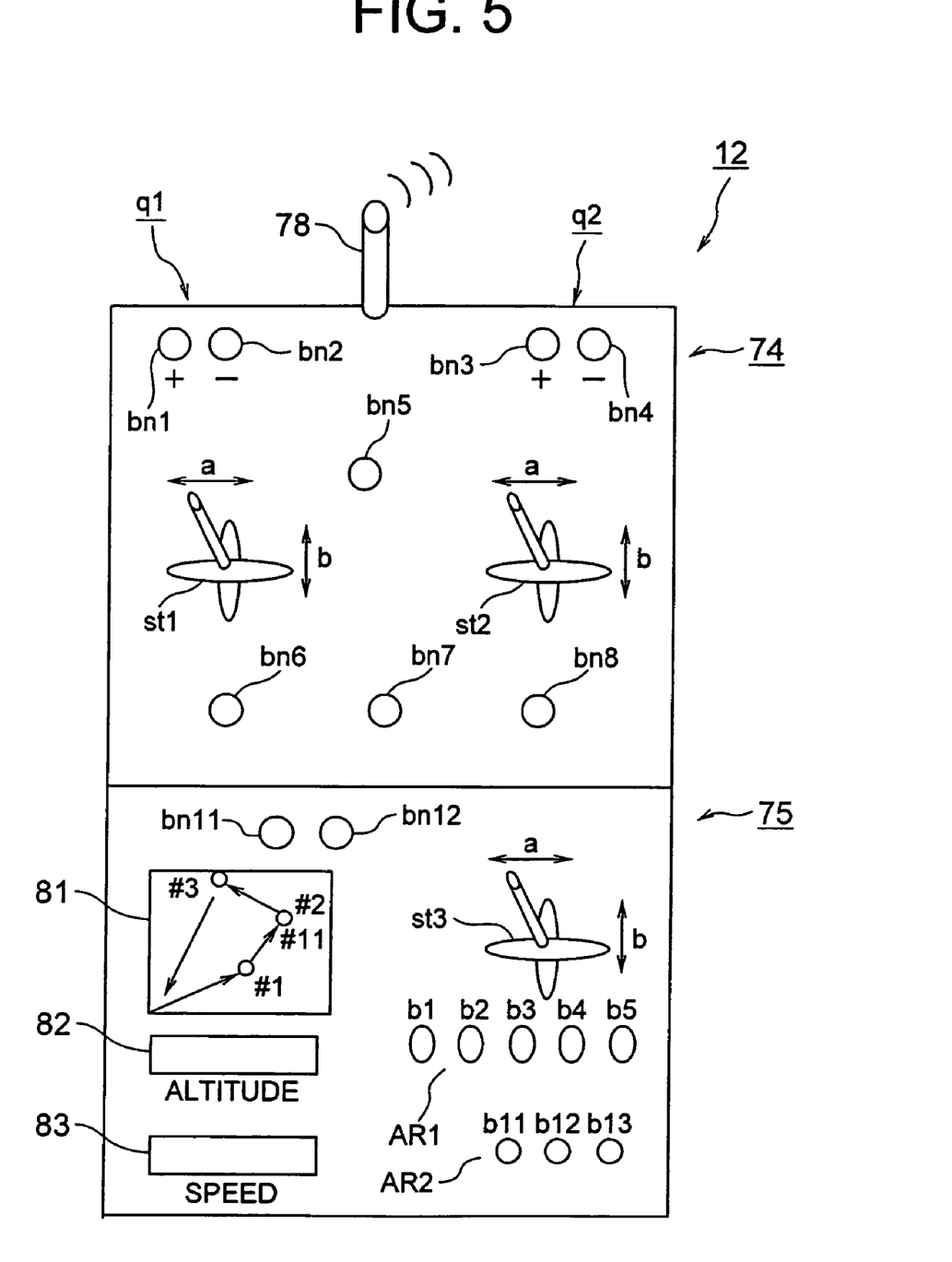
FIG. 5 is a plan view showing an on-ground controller in the first embodiment.

FIG. 1 is a perspective view of a flying unit in a first embodiment of the present invention, FIG. 2 is a schematic plan view of an opening and closing mechanism in the first embodiment, FIG. 3 is a schematic elevation of a dropping apparatus in the first embodiment, FIG. 4 is a block diagram of a control system of a wireless-controlled airplane in the first embodiment, and FIG. 5 is a plan view showing an on-ground controller in the first embodiment.

In these drawings, 11 is a flying unit, and 12 is an on-ground controller for wirelessly steering and flying the flying unit 11 under the operation of an operator. The flying unit 11 and the on-ground controller 12 are connected by communication sections 71 and 77 and together constitute a wireless-controlled airplane.

In the flying unit 11, 14 is a body. 15 and 16 are a pair of front wheels which are rotatably installed forward (to the left in FIG. 1) of the center of the body 14. 17 is a rear wheel which is rotatably installed in the vicinity of the rear end (the right end in FIG. 1) of the body 14. 21 is an engine (drive section for propulsion) installed on the body 14. 22 is a propeller (propulsion apparatus) which is disposed rearward (to the right in FIG. 1) of the engine 21, which is connected to the engine 21, and which generates a propulsive force when driven by the engine 21. The body 14 is formed of a molded product formed from a carbon resin such as a resin reinforced with carbon fibers.

The engine 21 is driven by combustion of a synthetic oil containing methanol as a fuel, nitromethane as an initiator, oil as a lubricant, and prescribed additives. The propeller 22 includes an annular hood 23 which is installed on the body 14 and a propeller body 24 which is rotatably installed inside the hood 23 and which is mounted on the crankshaft of the engine 21.

In this embodiment, the engine 21 is used as a drive section for propulsion, but it is possible to use an electric motor instead of the engine 21, and the propeller body 24 can be installed on the output shaft of the motor. In this embodiment, a synthetic oil is used as a fuel, but it is also possible to use gasoline or the like instead of a synthetic oil.

25 is a main wing (first wing) which is installed above the engine 21 and the propeller 22 and which has a roughly triangular shape. 26 and 27 are a pair of rectangular auxiliary wings (second wings) which are formed at the upper end of the central portion of the body 14 and which project to the left and right from the lower end of the engine 21. 31 is a vertical tail wing which projects upwards from the rear end of the body 14. 32 is a pair of horizontal tail wings (only one of which is shown in FIG. 1) which project to the left and right at the lower end of the vertical tail wing 31. Unillustrated flaps for increasing lift at low speeds and changing the flight speed and unillustrated ailerons (supplemental wings) for tilting the flying unit 11 to the left and right are installed on the auxiliary wings 26 and 27.

The vertical tail wing 31 has a fixed wing portion 34 which is fixed with respect to the body 14 and a rudder 35 (movable wing portion) which is pivotally supported by a hinge portion formed on the rear end of the fixed wing portion 34. A motor M1 (drive section for tail wing operation) is provided for rotating the rudder 35. When the motor M1 is driven to pivot the rudder 35, the flying unit 11 can be turned to the left or right. In this embodiment, the horizontal tail wings 32 project to the left and right at the lower end of the vertical tail wing 31, but they can instead project to the left and right at the upper end of the vertical tail wing 31.

The main wing 25 has a plurality of triangular wing elements. In this embodiment, it includes a pair of wing elements 38 and 39. The wing elements 38 and 39 are connected with each other by a connecting portion 41 comprising a hinge installed at their upper end portions so as to be able to move with respect to each other, i.e., so as to be able to pivot with respect to each other. An opening and closing mechanism 43 for changing the relative positions of the wing elements 38 and 39 is provided between the wing elements 38 and 39. By operating the opening and closing mechanism 43 and opening and closing the wing elements 38 and 39 by rotating them in the directions shown by the arrows in FIG. 2, the overlap between the wing elements 38 and 39 can be changed. For this purpose, the opening and closing mechanism 43 has an arcuate rack 44 provided on wing element 38, an arcuate rack 45 provided on wing element 39, and a pinion 46 rotatably installed between the racks 44 and 45. A motor M2 (drive section for operating the main wing 25) is connected to the pinion 46. When the motor M2 is driven, the overlap between the wing elements 38 and 39 can be changed, and the effective area of the main wing 25 can be varied. By varying the effective area, the speed of flight of the flying unit 11 can be changed. Namely, if the effective area of the main wing 25 is decreased, the flight speed of the flying unit 11 can be increased, and if the effective area of the main wing 25 is increased, the flight speed of the flying unit 11 can be decreased.

Each of the wing elements 38 and 39 has an outer frame 51 and an inner frame 52 which are disposed with a prescribed angle between them and a plate member 53 which is installed between the outer frame 51 and the inner frame 52. The plate member 53 is a carbon cloth impregnated with a resin. A beam 56 which extends in the transverse direction is suspended between the outer frames 51. The main wing 25 is supported by one front support member 58 which extends from the body 14 towards the connecting portion 41 and by two rear support members 59 and 61 which extend from the body 14 towards the beam 56. The beam 56 is able to elongate and contract as the wing elements 38 and 39 pivot about the connecting portion 41.

A camera 63 (imaging apparatus) is installed at the front end (the left end in FIG. 1) of the body 14 on its bottom surface, and a dropping apparatus 64 which can selectively hold and drop a load pg such as cargo housed inside the body 14 is provided at the center of the bottom surface of the body 14. The camera 63 photographs the region below the flying unit 11 and sends image data to the on-ground controller 12. The dropping apparatus 64 has a pair of doors 68 and 69 (opening and closing members) are pivotally installed on a housing portion 65 formed in a prescribed location (lower part) of the body 14, a motor M3 (drive section for dropping) connected to the doors 68 and 69, and gears g1 and g2 which transmit rotation generated by driving of the motor M3 to the doors 68 and 69. When the motor M3 is driven, the doors 68 and 69 can be closed to hold the load pg inside the housing portion 65, or the doors 68 and 69 can be opened to drop the load pg.

A GPS sensor 66 (present location sensing portion) is provided in a prescribed location of the body 14 for sensing the present location of the flying unit 11.

A battery 60 is provided for supplying electric power to the motors M1-M3, and a generator G is provided for charging the battery 60. The generator G is connected to the crankshaft of the engine 21 and is driven as the engine 21 is driven.

70 is a control section for carrying out overall control of the flying unit 11. 71 is a communication section for communication between the flying unit 11 and the on-ground controller 12. 72 is an antenna. The engine 21, the motors M1-M3, rotational speed sensors S1-S3 (speed sensing sections) for sensing the rotational speed of each of the motors M1-M3, the generator G, the camera 63, the GPS sensor 66, and the communication section 71 are connected to the control section 70.

In the on-ground controller 12, 74 is an operation section, 75 is a display section, 76 is a control section, 77 is a communication section for carrying out communication between the flying unit 11 and the on-ground controller 12, 78 is an antenna, and 80 is a data storing section (DB) for storing map data.

In the operation section 74, q1 is a flight speed setting portion which is used for setting the flight speed of the flying unit 11 at the time of automated flight. q2 is a main wing setting portion which is used for opening and closing the main wing 25 and setting the overlap of the wing elements 38 and 39 at the time of manual flight. The flight speed setting portion q1 has a button bn1 for accelerating the flying unit 11 and a button bn2 for decelerating the flying unit 11. The main wing setting portion q2 has a button bn3 for decreasing the overlap and increasing the area of the main wing 25 and a button bn4 for increasing the overlap and decreasing the area of the main wing 25. st1 is a first stick for steering and st2 is a second stick for steering. By moving the first stick st1 in the direction of arrow a, the rudder 35 is pivoted and the nose of the airplane can be turned to the left or right. By moving the first stick st1 in the direction of arrow b, unillustrated elevators installed on the horizontal wings 32 are pivoted whereby the nose of the plane can be pointed up or down. By moving the second stick st2 in the direction of arrow a, the ailerons are pivoted and the flying unit 11 can be turned to the left or right. By moving the second stick st2 in the direction of arrow b, the rotational speed of the engine 21 is varied and the flight speed can be changed.

bn5 is a button for turning the operation of the flying unit 11 on and off. bn6 is a button for manually opening and closing the doors 68 and 69. Each time the button bn6 is pressed, opening and closing the doors 68 and 69 are alternatingly carried out. bn7 is a button for manually carrying out attitude control when the flying unit 11 is influenced by wind or the like and its attitude deteriorates. Each time the button bn7 is pressed, attitude control is switched between manual attitude control and automatic attitude control. bn8 is a button which sends an instruction to return to a previously set flight path when the flying unit 11 has deviated from the previously set flight path.

In the display section 75, 81 is a display for displaying a map, for displaying a set flight path on the map, and for displaying an image photographed by the camera 63. 82 is a window for displaying the altitude of the flying unit 11. 83 is a window for displaying the flight speed. The display 81 and the windows 82 and 83 may be formed by a liquid crystal display, for example.

bn11 is a button for displaying a map, and bn12 is a button for displaying an image photographed by the camera 63. A flight path, drop points, and other information can be displayed on the map or on the image.

AR1 is a flight path setting portion for setting a flight path. AR2 is a drop point setting portion for setting drop points for the load pg. st3 is a third stick which moves a cursor when setting the flight path or the drop points. By moving the third stick st3 in the direction of arrow a, a cursor can be moved to the left and right on the display 81, and by moving the third stick st3 in the direction of arrow b, the cursor can be moved up and down on the display 81.

Accordingly, if the third stick st3 is moved in the directions of arrow a and arrow b to position the cursor at a first location of the flight path and the button b1 of the flight path setting portion AR1 is pressed, the flight path up to a location #1 is set on the display 81. The third stick st3 is then moved in the directions of arrow a and arrow b, the cursor is placed at a second position on the flight path, and if the button b2 of the flight path setting portion AR1 is pressed, the flight path is set up to a location #2 on the display 81. By repeating this operation, up to a location #5 on the flight path can be set. The display 81 in FIG. 5 shows the locations #1 to #3 on the flight path.

When the cursor is placed at each location on the flight path, by pressing the buttons b11-b13 of the drop point setting portion AR2, drop points #11-#13 can be set on the display 81. In FIG. 5, only one drop point #11 is shown.

Operation elements for carrying out all types of operation in the operation section 74 and the display section 75 are constituted by the buttons bn1-bn8, bn11, and bn12, the first through third sticks st1-st3, and the buttons b1-b5 and b11-b13.

Next, the operation of a wireless-controlled airplane having the above-described structure will be described.

First, as described above, the operator presses the button bn11 and displays the map on the display 81. He then manipulates the third stick st3 and the buttons b1-b5 and b11-b13 and sets the flight path and drop points. Unillustrated display processing means of the control section 76 then carries out display processing and displays the flight path and drop points on the display 81. When setting the flight path and the drop points, the speed of movement between each point, the altitude during flight, the altitude when dropping the load pg, and other parameters can be set.

Then, when the operator presses the button bn5 and initiates operation of the wireless-controlled airplane, the engine 21 is started, and unillustrated flight processing means of the control section 70 carries out flight processing. The flight path is read in from the control section 76, the engine 21 is driven at a prescribed rotational speed so as to rotate the propeller 22, whereby the flying unit 11 lifts off the ground. Further, the present location is read in from the GPS sensor 66, and the flying unit 11 is caused to fly on the flight path. At this time, if the position of the flying unit 11 deviates from the flight path, it is automatically returned to the flight path. When the final point on the flight path is reached, the flying unit 11 is automatically landed. In this embodiment, the length of one flight is two to three hours, and the flying unit 11 can fly at an altitude of up to 3,000 meters.

During this period, in accordance with the present location, the flight speed, the flight path, the speed of movement, the altitude, and the like, the flight processing means controls the propulsive force, the flight speed, the heading of the flying unit 11, and the like by varying the propulsive force by controlling the rotational speed of the engine 21, the position of the rudder 35 by controlling the position of the motor M1, and the area of the main wing 25 by controlling the position of the motor M2.

Unillustrated drop processing means of the control section 70 carries out drop processing. It reads in a drop point from the control section 76, and when the flying unit 11 reaches the drop point, it drives the motor M3 to open the doors 68 and 69 and drop the load pg.

When there is a head wind with a speed of approximately 4 meters per second, it is possible to carry out hovering of the flying unit 11. When performing hovering or when flying at a low speed, if the operator presses the button bn12, the display processing means displays the image photographed by the camera 63 on the display 81. Accordingly, the operator can press the button bn6 while viewing the image on the display 81 to manually open the doors 68 and 69 and drop the load pg.

In this manner, in this embodiment, the flight speed can be changed by varying the effective area of the main wing 25, so it is not necessary to greatly change the rotational speed of the propeller 22. Accordingly, the capacity of the engine 21 for rotating the propeller 22 can be reduced in size, so when the wireless-controlled airplane is used to transport a load pg, not only can an adequate space for housing the load pg be guaranteed, but the wireless-controlled airplane itself can be reduced in size.

Next, a second embodiment of the present invention will be described. Those portions of this embodiment having the same structure as in the first embodiment are identified by the same reference numerals in the drawings, and a description of those portions will be omitted, since they operate in the same manner and provide the same effects as in the first embodiment.

Figure 6:
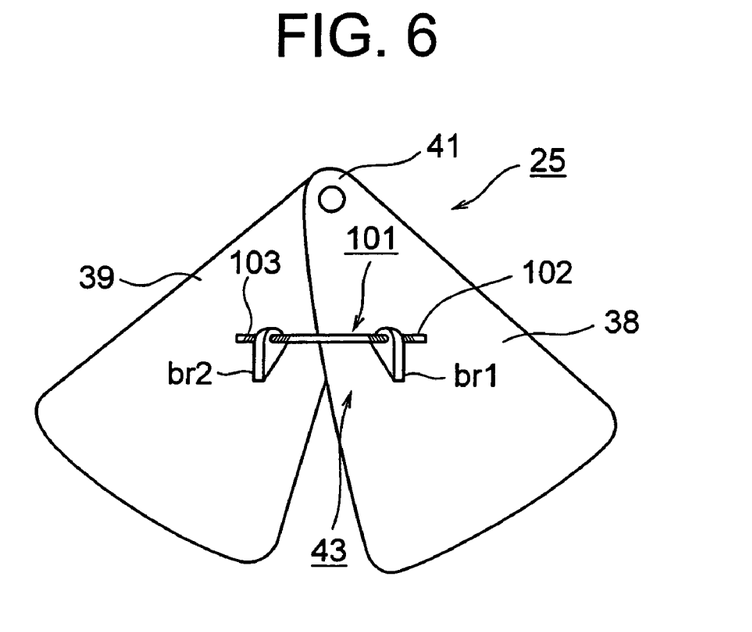
FIG. 6 is a schematic plan view of an opening and closing mechanism in a second embodiment of the present invention.

FIG. 6 is a schematic plan view of an opening and closing mechanism in the second embodiment of the present invention.

In this embodiment, brackets br1 and br2 are provided which protrude from wing elements 38 and 39. A female thread is formed inside each bracket br1 and br2. An externally threaded shaft 101 is installed between each bracket br1 and br2. Threaded portions 102 and 103 having mutually opposite thread directions are cut in the vicinity of both ends of the threaded shaft 101. An unillustrated motor is connected to the threaded shaft 101. When the threaded shaft 101 is rotated by driving the motor, the wing elements 38 and 39 are opened and closed.

Next, a third embodiment of the invention will be described. Those portions of this embodiment having the same structure as in the first embodiment are identified by the same symbols in the drawings, and a description of those portions will be omitted, since they operate in the same manner and provide the same effects as in the first embodiment.

Figure 7:
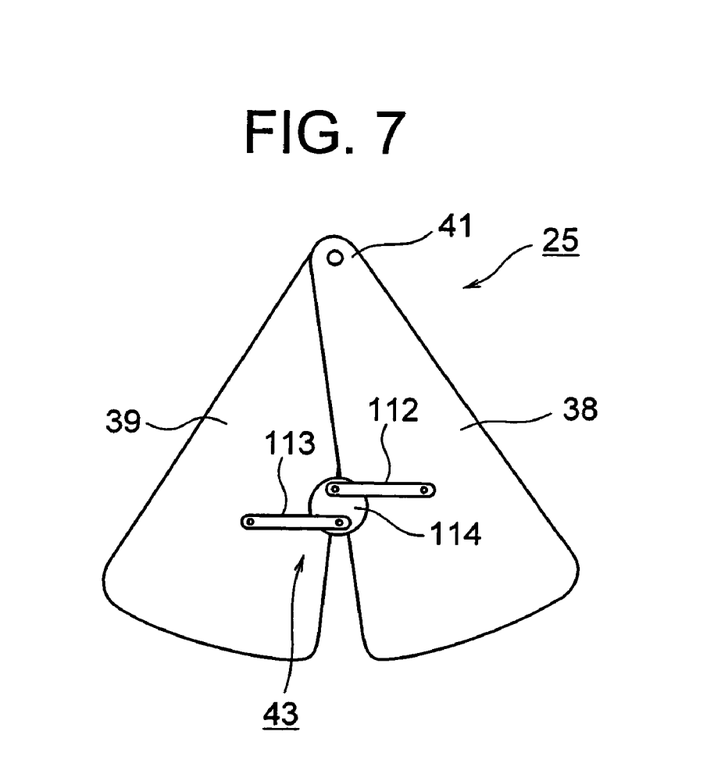
FIG. 7 is a schematic plan view of an opening and closing mechanism in a third embodiment of the present invention.

FIG. 7 is a schematic plan view of an opening and closing mechanism in the third embodiment of the present invention.

In this embodiment, one end of each link 112 and 113 is pivotally mounted on one of the wing elements 38 and 39, and the other end of each link 112 and 113 is pivotally connected to a rotatably supported rotating body 114. An unillustrated motor is connected to the rotating body 114. When the motor is driven to rotate the rotating body 114, the wing elements 38 and 39 are opened and closed.

Next, a fourth embodiment of the present invention will be described. Those portions of this embodiment having the same structure as in the first embodiment are identified by the same symbols in the drawings, and a description of those portions will be omitted, since they operate in the same manner and provide the same effects as in the first embodiment.

Figure 8:
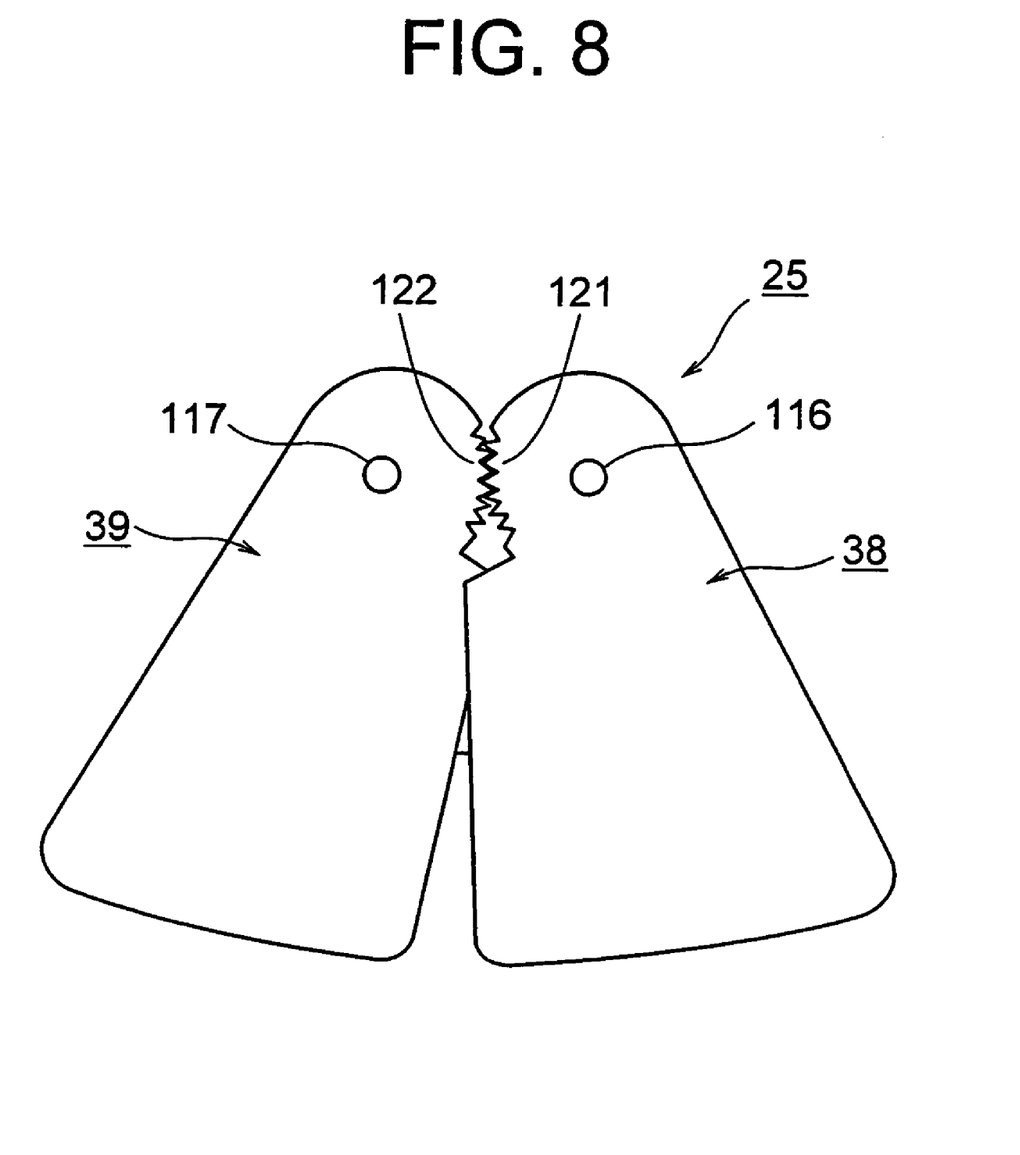
FIG. 8 is a schematic plan view of an opening and closing mechanism in a fourth embodiment of the present invention.

FIG. 8 is a schematic plan view of an opening and closing mechanism of the fourth embodiment of the present invention.

In this embodiment, wing elements 38 and 39 are pivotally supported for pivoting about shafts 116 and 117. In the vicinity of shafts 116 and 117, gears 121 and 122 (mutually opposing meshing portions) are formed on the wing elements 38 and 39 and mesh with each other. An unillustrated motor is connected to one of the wing elements 38 and 39 (to wing element 38 in this embodiment). When wing element 38 is rotated by driving this motor, wing element 39 which is linked thereto can be rotated.

Next, a fifth embodiment of the present invention will be described. Those portions of this embodiment having the same structure as in the first embodiment are identified by the same symbols in the drawings, and a description of those portions will be omitted, since they operate in the same manner and provide the same effects as in the first embodiment.

Figure 9:
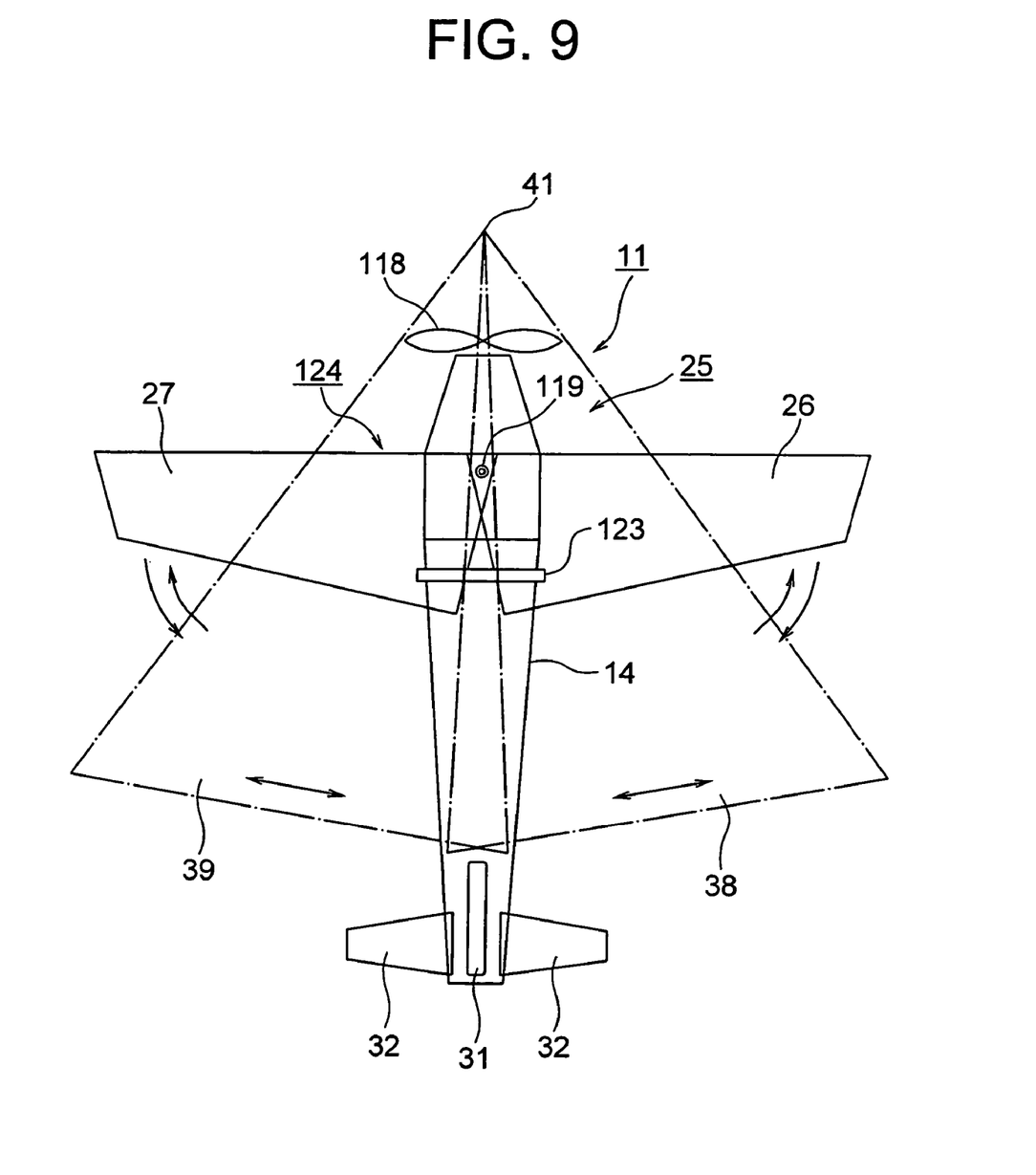
FIG. 9 is a schematic plan view of a flying unit in a fifth embodiment of the present invention.

FIG. 9 is a schematic plan view of a flying unit 11 in the fifth embodiment of the present invention.

In this drawing, 118 is a propeller for providing propulsion. The propeller 118 is installed on the front end (the upper end in the drawing) of the body 14 of the flying unit 11. An unillustrated engine is installed inside the front end of the body 14, and the engine is connected to the propeller 118. Auxiliary wings 26 and 27 are pivotally connected to each other by a connecting portion 119. An opening and closing mechanism 123 is installed between the auxiliary wings 26 and 27. By operating the opening and closing mechanism 123, the overlap between the auxiliary wings 26 and 27 can be changed, and the effective area of an auxiliary wing unit 124 comprising the auxiliary wings 26 and 27 can be varied. By changing the effective area of the main wing 25 and the auxiliary wing unit 124, the flight speed of the flying unit 11 can be changed with even greater certainty.

Next, a sixth embodiment of the present invention will be described.

Figure 10:
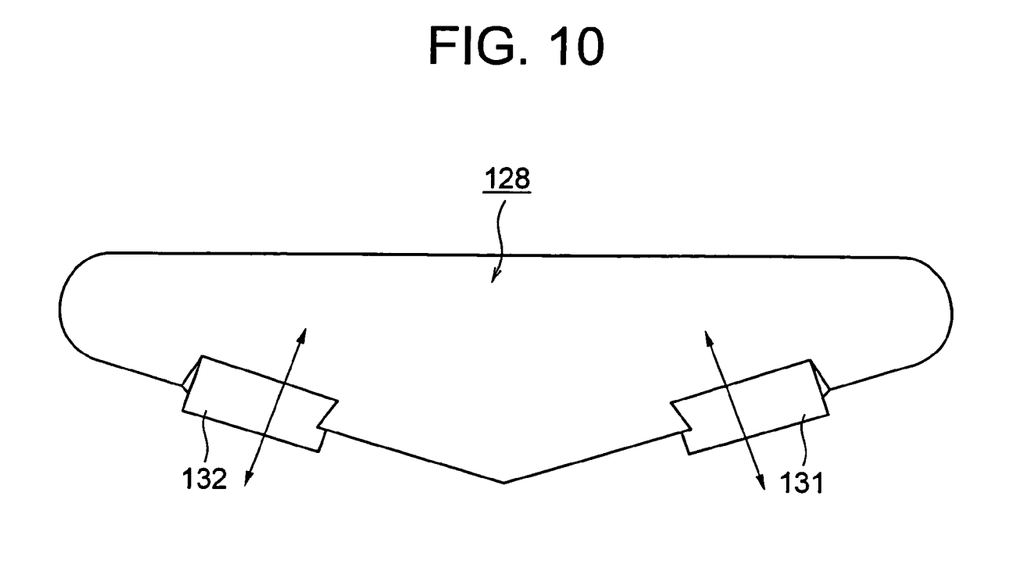
FIG. 10 is a schematic plan view of the main wing of a flying unit in a sixth embodiment of the present invention.

FIG. 10 is a schematic plan view of a main wing of a flying unit in the sixth embodiment of the present invention.

In this drawing, 128 is a main wing (first wing). Adjustable wings 131 and 132 are provided in prescribed locations on the left and right of the main wing 128 so as to be able to advance and retract in the direction of the arrows. The flight speed can be decreased by protruding the adjustable wings 131 and 132 and increasing the effective area of the main wing 128, and the flight speed can be increased by retracting the adjustable wings 131 and 132 and decreasing the effective area of the main wing 128.

In this embodiment, adjustable wings 131 and 132 are provided on the main wing 128, but adjustable wings can be provided on the auxiliary wings 26 and 27 of the first through fifth embodiments.

Next, a seventh embodiment of the present invention will be described.

Figure 11:
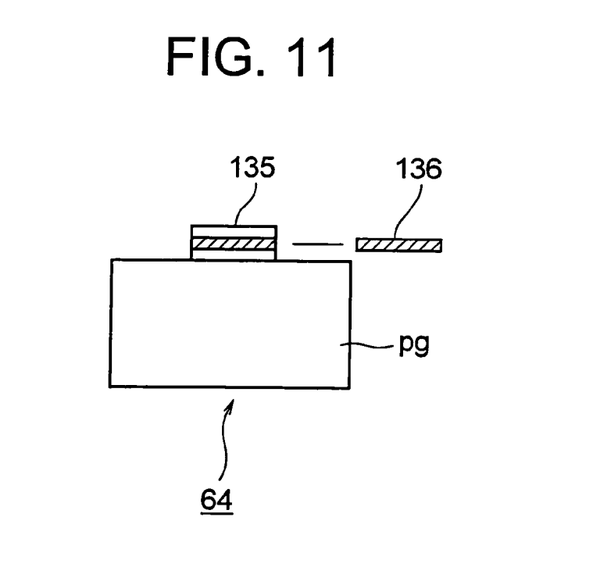
FIG. 11 is a schematic elevation of a dropping apparatus in a seventh embodiment of the present invention.

FIG. 11 is a schematic elevation of a dropping apparatus in the seventh embodiment of the present invention.

In this embodiment, an engaged portion 135 is provided in a prescribed location of a load pg, and an engaging portion 136 is movably provided in a prescribed location on the body 14 (FIG. 9). When the load pg is being transported, the engaged portion 135 and the engaging portion 136 are engaged with each other, and when the load pg is dropped, the engaging portion 136 is moved and disengaged from the engaged portion 135.

Next, an eighth embodiment of the present invention will be described. Those portions of this embodiment having the same structure as in the fifth embodiment are identified by the same symbols in the drawings, and a description of those portions will be omitted, since they operate in the same manner and provide the same effects as in the fifth embodiment.

Figure 12:
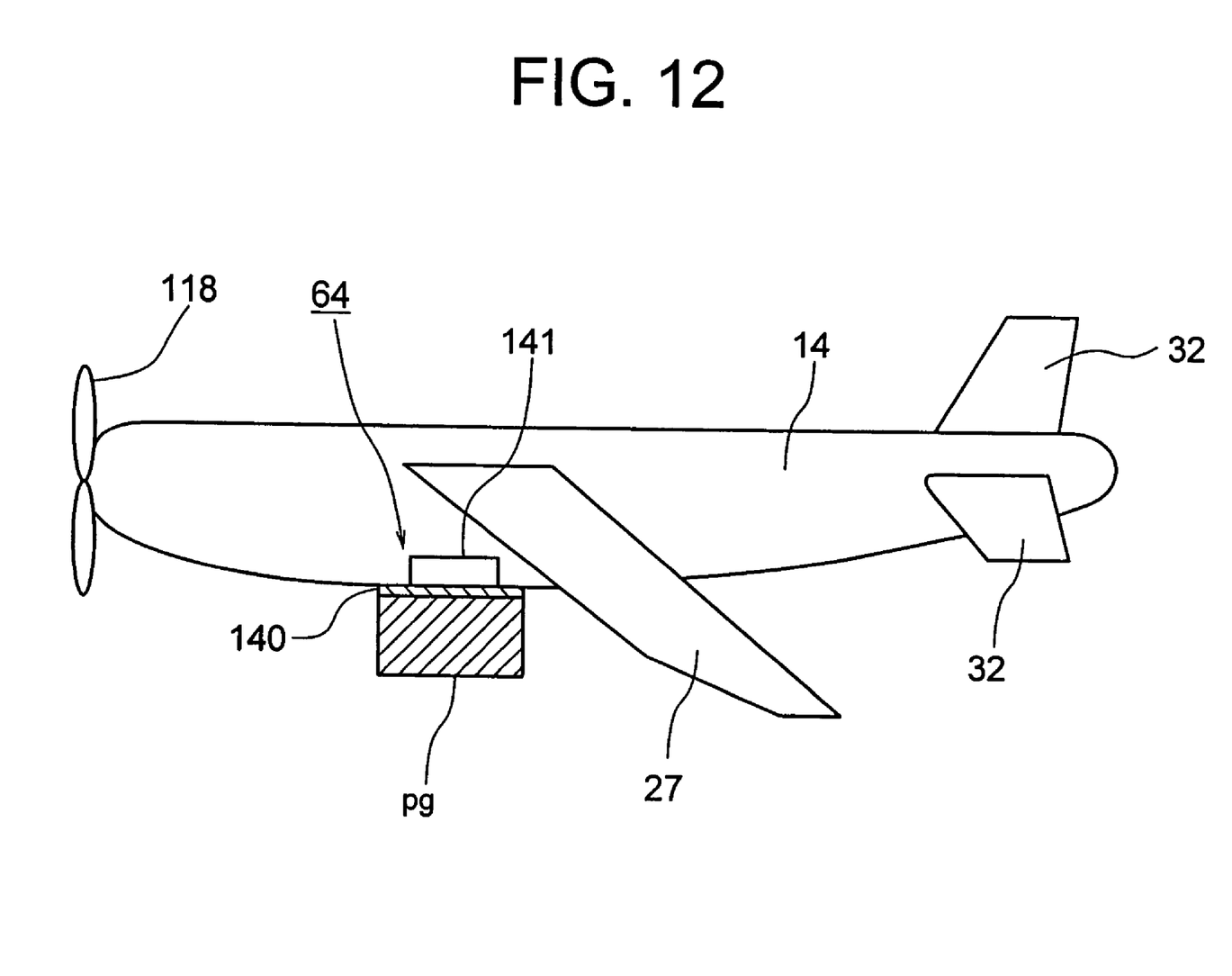
FIG. 12 is a schematic side elevation of a flying unit in an eighth embodiment of the present invention.

FIG. 12 is a schematic side elevation of a flying unit in the eighth embodiment of the present invention.

In this embodiment, an attracted portion 140 comprising a strongly magnetic body is provided in a prescribed location on a load pg, and an attracting portion 141 comprising an electromagnet is provided in a prescribed location on the body 14 of the flying unit 11. When the load pg is being transported, current is supplied to the attracting portion 141, and the load pg is attracted through the attracted portion 140. When the load pg is to be dropped, current is no longer supplied to the attracting portion 141, and attraction of the load pg through the attracted portion 140 is released.

The present invention is not limited to the above-described embodiments. Numerous modifications and variations of the present invention are possible in light of the spirit of the present invention, and they are not excluded from the scope of the present invention.

What is claimed is:

1. A wireless-controlled airplane comprising:
   a flying unit having a body, a drive section installed on the body, a propulsion apparatus which generates a propulsive force when driven by the drive section, a main wing mounted on a top side of the body and comprising a plurality of overlapping wing elements which are movable relative to each other, an opening and closing mechanism which changes the relative positions of the wing elements so as to change the overlap of the wing elements and thereby change the effective area of the main wing and the speed of the flying unit, and a dropping apparatus for selectively holding and dropping a load downward; and an on-ground controller which is connected to the flying unit through a communication section and which controls the flying of the flying unit in accordance with operation by an operator;

wherein the dropping apparatus includes a housing for holding a load, the housing being located over an opening in a bottom side of the body, opposite the top side, at least one door member for selectively opening and closing the opening in the bottom side of the body and a door drive for selectively moving the door member between open and closed positions; and wherein the wing elements are triangular in shape and each wing element has an apex connected at a common pivot point and wherein the movement of the wing elements relative to each other is a pivoting movement.

2. A wireless-controlled airplane as claimed in claim 1 wherein the flying unit includes a present location sensing portion which senses the present location of the flying unit, and flying processing means which causes the flying unit to fly along a previously set flight path in accordance with the present location.

3. A wireless-controlled airplane as claimed in claim 1 wherein the flying unit has drop processing means for dropping the load at a previously set drop point.

4. A wireless-controlled airplane as claimed in claim 1 wherein the flying unit has an auxiliary wing disposed between the main wing and the body.

5. A wireless airplane as claimed in claim 1 further comprising a second door and wherein the door drive pivots the first and second doors toward the body to close the opening and pivots the first and second doors away from the body to uncover the opening and allow the load to be dropped.

* * * * *